United States Patent [19]

Kriss, II

[11] Patent Number: 4,862,036
[45] Date of Patent: Aug. 29, 1989

[54] ELECTRICAL CIRCUIT FOR CONTROLLING THE OPERATION OF HIGH INTENSITY MOTORCYCLE LAMPS

[76] Inventor: George H. Kriss, II, P.O. Box 35331, Tucson, Ariz. 85740

[21] Appl. No.: 129,599

[22] Filed: Dec. 7, 1987

[51] Int. Cl.[4] ............................................. B60Q 1/14
[52] U.S. Cl. .................................... 315/82; 315/76; 315/77; 307/10.8
[58] Field of Search ..................... 315/26, 77, 82, 83, 315/80, 79; 340/92; 307/10 LS

[56] References Cited

U.S. PATENT DOCUMENTS

| | | | |
|---|---|---|---|
| 3,402,321 | 9/1966 | Tagawa | 315/83 |
| 3,832,597 | 8/1974 | Mitchell | 315/82 |
| 3,993,914 | 11/1976 | Conrad et al. | 315/82 |
| 4,097,839 | 6/1988 | Lesiak | 315/82 |
| 4,667,129 | 5/1987 | Papillon | 307/10 LS |
| 4,728,861 | 3/1988 | Kurihara et al. | 315/82 |

FOREIGN PATENT DOCUMENTS 5077385  8/1977  Japan .................. 315/80

Primary Examiner—Ulysses Weldon
Assistant Examiner—Brian Palladino
Attorney, Agent, or Firm—Nelson & Roediger

[57] ABSTRACT

An electrical circuit for controlling the power consumption of high intensity motorcycle lamps which reduces the voltage across the lamps during long periods of operation and enables the lamps to alternate operation between full and reduced intensity. A mode selector switch is coupled to a relay switch for each lamp so as to vary the voltage thereacross as well as to a power control switch for full intensity operation.

13 Claims, 1 Drawing Sheet

ELECTRICAL CIRCUIT FOR CONTROLLING THE OPERATION OF HIGH INTENSITY MOTORCYCLE LAMPS

BACKGROUND OF THE INVENTION

This invention relates to an electrical circuit for controlling the operation of high intensity motorcycle lamps and, in particular, permits the operator to reduce the power consumption of high intensity motorcycle lamps for long periods of use.

The standard motorcycle comes equipped with a central head lamp which is used by the operator to illuminate his path of travel and to indicate to other users of the road, the presence of the motorcycle and operator. Since the silhouette provided by a motorcycle having a single head lamp is quite narrow to observers, the operators of other motor vehicles are likely to fail to identify the motorcycle as such. As a result, the operation of a motorcycle tends to become unduly hazardous. Furthermore, the single head lamp provides limited illumination of the roadway, thus frequently failing to advise the operator of road hazards or the condition of adjacent portions of the roadway in the event that prompt evasive action is necessary. Consequently, the motorcycle owner has taken to retrofit a pair of lights to be used for driving that extend outwardly of the central section of the motorcycle. Typically, these head lamps are located proximate to the axle of the front wheel. Often, these accessories are mounted adjacent the turn signals found in newer model motorcycles.

The popularity of additional driving light accessories can be readily seen by the number of different styles of head lamps available to the public. The recent advent of the quartz halogen high intensity lamp has generated increasing interest in the use of these lamps for motorcycles. The typical quartz halogen lamp is a single filament lamp which is characterized by a high intensity beam. However, the power requirements of this type of lamp limits the use on motorcycles which have limited generating capacity. For example, a typical high intensity quartz halogen lamp has a power requirement of 55 watts per light, and with the 12 volt motorcycle battery, it is to be noted that a pair of lights results in a tremendous power drain of the battery during periods of continued use. This problem of power consumption is not particularly important in car and truck usage wherein large capacity alternators are used. This is not the case with the motorcycle wherein space for components is severely limited so that the user who accessorizes his motorcycle to incorporate a pair of high intensity lamps must manually control the use of these lamps during operation so as not to drain the battery.

Furthermore, the use of a pair of high intensity lamps is often inappropriate under certain driving conditions so that the operator is required to resort to the single head lamp which results in the limited visibility and narrowed silhouette presented to oncoming motor vehicle drivers. While it has been possible to provide alternate operation of high intensity lamps between full intensity and zero intensity through manual operation, this is exceedingly awkward during long periods of operation.

Accordingly, the present invention is directed to an electrical circuit for use in connection with high intensity motorcycle lamps which permits the cyclist to operate a pair of high intensity lamps at a reduced intensity level for long term operation. In addition, the present invention permits the cyclist to select high intensity operation by use of the standard motorcycle high beam switch thereby providing safe, full-time hands-on control rather than requiring the operator to reach for a remote switch. The electrical circuit disclosed herein can be connected directly to the ignition circuit of the motorcycle so that the high intensity lamps are automatically disabled when the engine is started thereby directing full power to the starter. Further, the invention permits the alternate cycling of a pair of high intensity lamps from the full intensity to reduced intensity operating modes without requiring the operator to continually activate a switch.

SUMMARY OF THE INVENTION

The invention relates to an electrical circuit for reducing the power consumption of high intensity lamps mounted on a motorcycle. The lamps are normally mounted in the region surrounding the front axle of the motorcycle. First and second lamps are electrically connected in series between a power supply terminal and a reference potential.

The present invention includes a mode selection switch which has an input terminal coupled to the power supply or battery terminal and has full, reduced and zero intensity operating mode positions, each with a respective output terminal. A power control switch is connected between the half intensity output and the first lamp. This switch is actuated by the mode selection means being placed in the full or half intensity operating mode positions. As a result, the high intensity lamps are capable of being energized when the power control switch is closed.

First and second relay switches are provided for the corresponding high intensity series connected lamps. The first relay switch which includes first and second switch terminals and a control terminal has its first terminal coupled to the connection between the first and second lamps and the second terminal coupled to a reference potential. The second relay switch has first, second and third switch terminals as well as a control terminal. The first terminal is connected to the power control switch with the second terminal coupled to the connection of said first and second series connected lamps. The third terminal is connected to the second lamp.

The control terminals for the first and second relay switches are each connected to the full intensity output terminal of the mode selection means. The placement of the mode selection means in the full intensity operating mode position effects closure of the first relay switch and couples the full battery voltage across the first lamp. When this occurs the second relay is connected to the power control switch so that the lights are electrically connected in parallel with the battery connected thereacross.

During normal operation, the first relay switch is in an open position and the second relay switch is closed so that the power control switch applies the battery voltage across the series connected pair of head lamps. This corresponds to reduced intensity operation. The mode selection means has a position corresponding to zero intensity which results in the power control switch remaining in a normally open position.

In a preferred embodiment of the invention, an inverter circuit which provides opposite phase output signals of approximately one-half the battery voltage is provided with two outputs, each of which is coupled to a relay switch. When the mode selection means is placed in the reduced intensity operating position and the inverter circuit is coupled to the motorcycle battery, the first and second head lamps alternately energized to the full intensity position thereby providing a highly visible flashing output. In addition, the power control switch can be readily coupled to a conventional motorcycle alarm circuit so that when the alarm is activated, the power control switch is closed regardless of the position of the mode selection means and the lights are activated to deter theft or vandalism. To promote safe operation, it is desirable to provide a connection through the high beam switch to the battery. This connection is made to the full intensity terminal of the mode selection switch so that the operator can cause the head lamps to go from the reduced intensity operating level to the full intensity level by actuating a switch located at the cycle control panel.

Further features and advantages of the invention will become more readily apparent from the following detailed description of specific embodiments of the invention when taken in conjunction with the accompanying drawings.

DESCRIPTION OF THE PREFERRED EMBODIMENTS

Figure 1:
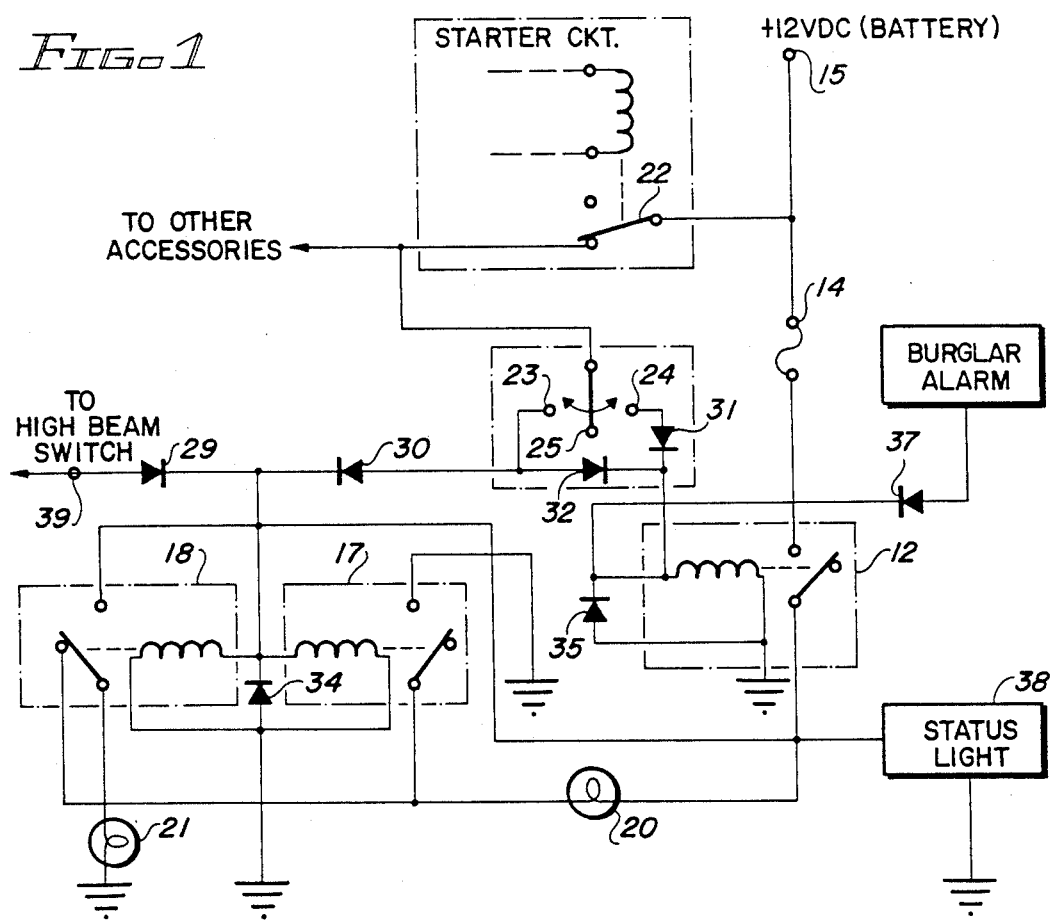
FIG. 1 is an electrical schematic of one embodiment of the invention.

Referring now to FIG. 1, first and second high intensity motorcycle head lamps 20 and 21 respectively are coupled between power control switch 12 and a reference potential. The connection of second head lamp 21 shown in FIG. 1 to the first head lamp 20 is made by a second relay switch 18. As shown, the lamps are in the series connected position so that closure of power switch 12 results in the application of the 12 volt motorcycle battery connected to power supply terminal 15, being coupled through fuse 14 across the series combination of the two high intensity lamps. In this situation, each lamp receives approximately one-half of the 12 volts thereacross and is operating at reduced intensity.

The power control switch 12 is a relay-operated switch connected to mode selection means 11. The mode selection means is a three-position switch with the central position, terminal 25, corresponding to the fully off or deactivated operating mode. The switch arm of the mode selection means is connected through a standard kill-switch 22 in the starter circuit and from that switch to the power supply terminal 15. Thus, no power is supplied through the kill-switch when the ignition circuit is activated to start the motorcycle. The connection to other accessories from switch 22 is shown by the arrow in FIG. 1. This kill-switch is standard equipment on motorcycles to permit the full power of the battery to be supplied to the starter mode. As soon as the starter motor is disengaged, the kill-switch 22 closes and power is available to the switch arm of the mode selection means 11. Terminals 23 and 24 of the mode selection means correspond to the full intensity and reduced intensity operating modes respectively.

The reduced intensity terminal 24 is coupled through diode 31 to the power control switch. The full intensity terminal 23 is coupled through diode 32 to the power control switch and through diode 30 to the relays of first and second relay switches 17 and 18. A blocking diode 29 is placed in the circuit between the high beam switch on the operating panel of the motorcycle and the relays of the first and second switches. The first relay switch 17 is shown in a normally open position and is coupled between the interconnection of the series connected lamps 20 and 21 to a reference potential or a ground. When the first switch is actuated, the full battery voltage at power supply terminal 15 appears across first lamp 20. The lamp is then operating at full intensity.

The second relay switch 18 is shown in FIG. 1 in the normal operating position with the lamp 21 being connected in series with first lamp 20. When the switch 18 is actuated, the second lamp 21 is coupled then to the power control switch. Also, a status light 38 is coupled between the power control switch and the reference potential. The status light is provided in preferred embodiments to indicate to the operator that the first and second head lamps are energized and serves as a visual reminder during operation. A connection to a burglar alarm is shown through diode 37 whereby the actuating relay of the power control switch is coupled directly to a conventional burglar alarm, and as will later be explained automatically enables the burglar alarm to turn on the high intensity lamps as a protective measure.

When the operator has started the motor of his vehicle, the kill-switch 22 is closed and the mode selection means is moved to either the full intensity terminal 23 or the reduced intensity terminal 24, if the head lamps are to be energized. In either of these positions, the voltage is coupled either through terminal 23 and blocking diode 32 or through terminal 24 and protective diode 31 to the relay of the power control switch 12. As noted, the relay is provided with a protective diode 35 which insures that the relay coil does not go to a more negative potential than the reference potential. The application of the voltage to the coil results in a closing of power switch 12 thereby supplying power to the series connected first and second lamps 20 and 21. The first and second relay switches are in their normal position if the mode selection means is in its reduced power position and the power control switch is coupled to terminal 24. However, if the operator selects the full intensity mode and puts the mode selection means switch arm to terminal 23, the voltage is then applied to the relay coils of switches 17 and 18. This results in the connection of first lamp 20 to ground and the opening of the interconnection between the serially connected lamps. Lamp 21 is connected then by switch 18 through diode 30 to terminal 23 of mode selection means 11. Thus, the battery voltage is applied directly across lamp 21. As a result, both lamps experience the full voltage and are operated at full intensity. The protective diode 34 is incorporated in the first and second relay switches for protective purposes.

Since the present invention is an accessory to be installed on a already manufactured motorcycle, it may be inconvenient to locate the mode selector switch at a position readily accessible to the cyclist so that he can activate without releasing one hand. Consequently, the circuit includes diode 29 coupling the first and second relay switch as to the already provided high beam switch. The connection is shown via terminal 39 in FIG. 1. The activation of the high beam switch results in the battery voltage being applied to the first and second relay switches and puts the first and second lamps 20 and 21 in the full intensity mode without requiring the mode selection switch to be moved from terminal 24 to terminal 23.

Figure 2:
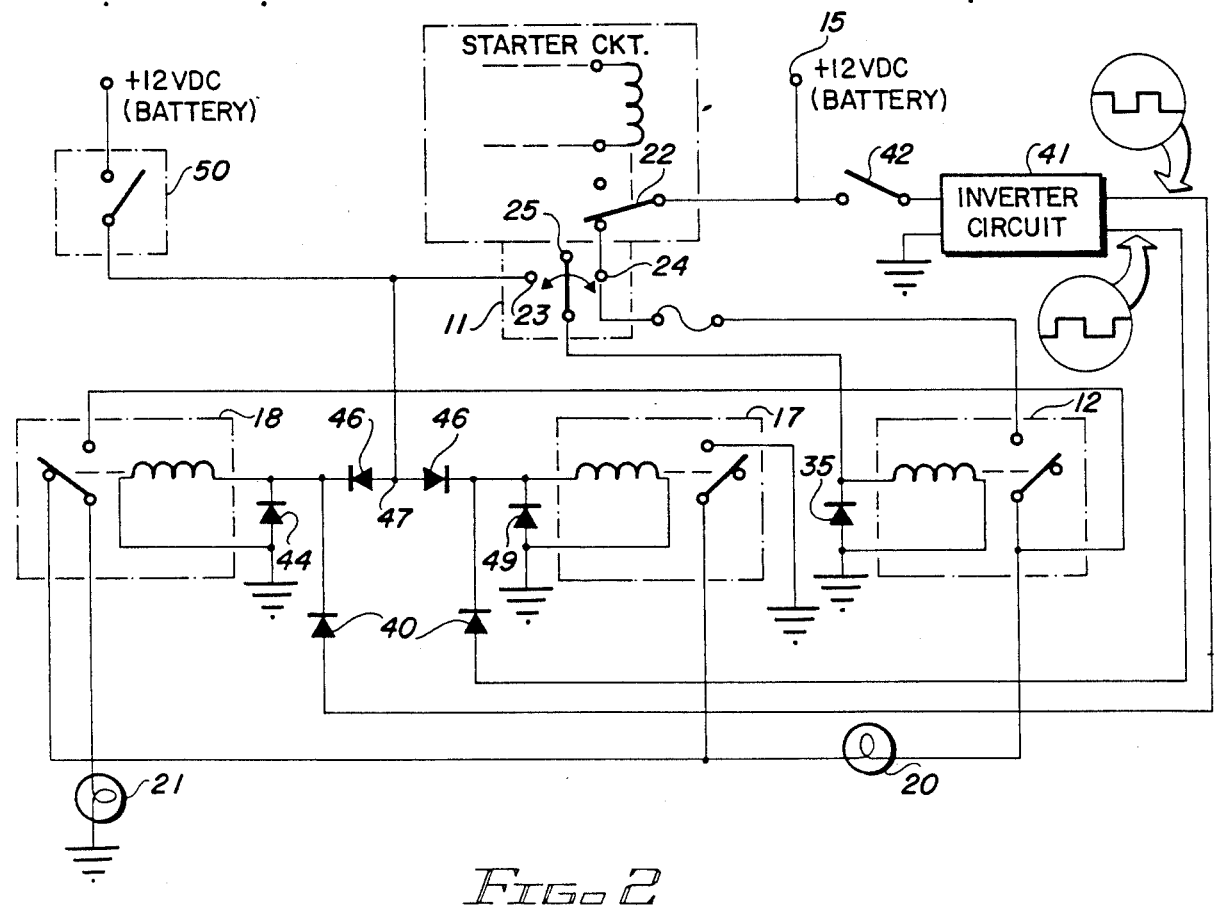
FIG. 2 is an electrical schematic of a second embodiment of the invention showing the connection of the inverter circuit to provide flashing of the head lamps during use.

A second embodiment of the invention is shown in FIG. 2 wherein like parts utilize the identical numbers of the embodiment of FIG. 1. In FIG. 2, the power supply terminal 15 from the motorcycle battery is coupled through kill-switch 22 of the motorcycle starter circuit to the mode selection means 11. Terminal 24 of the mode selection switch corresponds to the reduced intensity operation of lamps 20 and 21. In the embodiment of FIG. 2, terminal 24 is coupled to the power supply terminal and to power control switch 12. As a result, the battery voltage is available at power control switch 12 when the motorcycle is in operation. However, the power control switch 12 is not closed when the mode selection switch is in the position shown in FIG. 2 wherein the switch arm is contacting terminal 25, the zero intensity position. The movement of the switch arm to terminal 24 results in the closure of the power control switch 12 and the battery voltage being applied across the series connected lamps 20 and 21.

The first and second relay switches 17 and 18 which are used to control the intensity of lamps 20 and 21 respectively are connected in the same manner as previously described in connection with the embodiment of FIG. 1. Each relay switch has an individual protective diode 44, 49 to essentially eliminate negative transients from influencing the relay switches. Each relay is coupled through a diode 40 to inverter circuit 41 which provides a square wave output signal for each relay. The output signals are out of phase and have The inverter circuit 41 is coupled to switch 42 to power supply terminal 15. A pair of blocking diodes 46 are coupled between common terminal 47 and each relay switch to isolate the signals from the inverter circuit.

Terminal 23 of mode selection switch 11 is coupled to the common terminal 47. When the arm of the mode selection switch contacts terminal 23, the control switch 12 returns to its normally open position as shown in FIG. 2 and the lamps are not supplied with power except upon closure of thumb switch 50 by the operator. The full intensity operation then is controlled by the operator from a switch on the control panel. The closure of this switch can be readily accomplished during operation of the motorcycle and results in the battery voltage being applied to terminal 47 thereby changing the position of the first and second relay switches from that shown in FIG. 2. Also, the closure of thumb switch 50 provides a voltage at terminal 23 which results in closure of the power control switch 12 and the application of the battery voltage across lamp 20. As shown, when the mode selection means arm is contacting terminal 23 the voltage at the power control switch is coupled also across lamp 21. As a result, both lamps receive full voltage and the opening of thumb switch 50 de-energizes both lamps. This alternate control feature in the embodiment of FIG. 2 enhances the safety features of this circuit. In the event that the operator is using the reduced intensity operating mode with the mode selector arm contacting terminal 24 and lamps 20 and 21 electrically in series, the closure of thumb switch 50 results in the application of the battery voltage across each of the two lamps so that they operate in their full intensity mode.

The switch 42, which causes the inverter circuit to provide its out of phase output signals, is used when the mode selection switch is in the reduced intensity position with the mode selection arm contacting terminal 24. The addition of the voltage waveforms shown across the lamps in alternate manner results in them flashing between their low intensity and full intensity operating modes. This is an effective warning device and can be utilized as desired. Typical applications for this embodiment would be in connection with emergency equipment, for example police motorcycles. In one embodiment tested and operated the full intensity power consumption of the quartz halogen lamps was 55 watts per light which was reduced to 17 watts per light by the use of the present invention. This much reduced level of power consumption allowed continuous operation of the quartz halogen lamps at the reduced intensity level without exceeding the generating ability of the standard motorcycle equipment and thus essentially eliminated the heavy battery drain heretofore characteristic of quartz halogen lamps. Further, the inverter circuit provided a square wave output at 70 cycles per minute which resulted in a corresponding flashing of the lights to the high intensity level. The Halogen Light Alternate Flasher made by Lectric Lite, Ft. Worth, Tex., was utilized in the embodiment of FIG. 2.

While the above-description has referred to specific embodiments of the invention, it is to be noted that many modifications and variations may be made therein without departing from the scope of the invention as claimed.

What I claim is:

1. An electrical circuit for controlling the operation of first and second lights connected in series between a power supply terminal and a reference potential, said circuit comprising:
    (a) mode selection means coupled to the power supply and having full intensity, zero intensity and low intensity operating modes;
    (b) a power control switch connected between the power supply terminal and said first light, said switch being responsive to the placement of said mode selection means in the full intensity and low intensity operating modes to couple said first light to the power supply terminal;
    (c) first controlled switch means responsive to the placement of said mode selection means in the full intensity operating mode; said means being coupled between said first and second lights for connecting said first light to a reference potential when activated by said mode selection means; and
    (d) second controlled switch means coupled between said first and second lights and responsive to the placement of said mode selection means in the full intensity operating mode; said second means coupling said second light to the power supply terminal and concurrently terminating the series connection between first and second lights when activated by said mode selection means.

2. The invention in accordance with claim 1 further comprising a status indicator connected between the power control switch and said first lamp.

3. The invention in accordance with claim 1 further comprising:
    (a) circuit means for alternately activating said first and second switch means when said mode selection means is in the low intensity mode to provide alternate flashing of said lights, and (b) means for coupling said circuit means to a power supply and thereby actuate said circuit means.

4. The invention in accordance with claim 3 further comprising override means for coupling said first and second controlled switch means to a second power supply when the mode selection means is in the low intensity operating mode.

5. The invention in accordance with claim 4 further comprising disabling means responsive to external control for interrupting the connection between the power control switch and the power supply terminal.

6. The invention in accordance with claim 5 wherein said power control switch is normally open.

7. An electrical circuit for reducing the power consumption of high intensity lamps for use with motorcycles wherein first and second lamps are connected to a common terminal and in series between a power supply terminal and a reference potential, said circuit comprising:
   (a) mode selection means having an input terminal coupled to the power supply terminal and having full, reduced and zero intensity operating mode with full and reduced intensity output terminals respectively;
   (b) a power control switch connected between said power supply terminal (half intensity output) and said first lamp, said switch being actuated when said mode selection means is in the full and reduced intensity modes;
   (c) a first relay switch having first and second switch terminals and a control terminal, said first terminal being connected to the common terminal between said first and second lamps, said second terminal being connected to a reference potential, said control terminal being connected to the full intensity output terminal; and
   (d) a second relay switch having first, second and third switch terminals and a control terminal, said first terminal being connected to said power control switch, said second terminal being connected to the common terminal between said first and second lamps, said third terminal being connected to said second lamp, said control terminal being connected to the full intensity output terminal, the placement of said mode selection means in the full intensity operating mode closing said first and second relay switches and connecting the second lamp to said power control switch.

8. The invention in accordance with claim 7 wherein said power control switch is maintained in a normally open position.

9. The invention in accordance with claim 8 further comprising disabling means coupled between the input terminal of said mode selection means and the power supply terminal.

10. The invention in accordance with claim 8 wherein the first switch terminal of said second relay switch and said control terminals are connected to a second power supply terminal to permit overriding of the mode selection means when in the reduced intensity operating mode.

11. The invention in accordance with claim 10 further comprising a status indicator connected to the power control switch.

12. The invention in accordance with claim 10 further comprising means for externally actuating said power control switch independently of said mode selection means.

13. The invention in accordance with claim 12 further comprising circuit means having first and second output terminals each connected to the control terminal of a relay switch for alternately activating the relay switches, and means for coupling said circuit means to a power supply terminal.

* * * * *